(12) United States Patent
Lee et al.

(10) Patent No.: US 12,056,066 B2
(45) Date of Patent: Aug. 6, 2024

(54) SYSTEM, DEVICE, AND METHOD FOR ACCESSING MEMORY BASED ON MULTI-PROTOCOL

(71) Applicant: SAMSUNG ELECTRONICS CO., LTD., Suwon-si (KR)

(72) Inventors: Jeongho Lee, Gwacheon-si (KR); Younho Jeon, Gimhae-si (KR); Daehui Kim, Gumi-si (KR); Heehyun Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 17/466,726

(22) Filed: Sep. 3, 2021

(65) Prior Publication Data
US 2022/0147470 A1    May 12, 2022

(30) Foreign Application Priority Data
Nov. 11, 2020   (KR) .................. 10-2020-0150510

(51) Int. Cl.
*G06F 13/16*   (2006.01)
*G06F 13/40*   (2006.01)

(52) U.S. Cl.
CPC ...... *G06F 13/1668* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 6,963,950 B2* | 11/2005 | Yamagami | G06F 11/1666 711/111 |
| 10,140,057 B2 | 11/2018 | Jung | |
| 10,452,269 B2 | 10/2019 | Yoon | |
| 10,452,278 B2 | 10/2019 | Benisty | |
| 10,564,872 B2 | 2/2020 | Benisty | |
| 2009/0018993 A1* | 1/2009 | McCool | G06F 16/2453 |
| 2011/0060879 A1* | 3/2011 | Rogers | G09G 5/001 711/119 |
| 2011/0202737 A1* | 8/2011 | Takahashi | G06F 11/201 711/E12.103 |
| 2014/0115240 A1* | 4/2014 | Jin | G06F 3/0611 711/103 |
| 2018/0357170 A1* | 12/2018 | Benisty | G06F 3/0656 |
| 2019/0004990 A1* | 1/2019 | Van Doren | G06F 13/385 |
| 2019/0146695 A1 | 5/2019 | Kim et al. | |
| 2020/0050401 A1 | 2/2020 | Gibb et al. | |
| 2020/0159584 A1 | 5/2020 | Cho et al. | |
| 2020/0327084 A1* | 10/2020 | Choudhary | G06F 12/0815 |
| 2020/0327088 A1* | 10/2020 | Choudhary | G06F 13/385 |
| 2020/0327089 A1* | 10/2020 | Dastidar | G06F 13/4221 |

* cited by examiner

*Primary Examiner* — Farley Abad
*Assistant Examiner* — Dayton Lewis-Taylor
(74) *Attorney, Agent, or Firm* — Sughrue Mion, PLLC

(57) ABSTRACT

A device configured to communicate through a bus may include a first interface circuit configured to, based on a first protocol, provide first access to a first memory through the bus and a second interface circuit configured to, based on a second protocol, provide a non-coherent input/output (I/O) interface through the bus. The second interface circuit may be configured to access the first memory in response to a message received through the bus based on the second protocol to provide second access to the first memory through the bus.

18 Claims, 14 Drawing Sheets

SYSTEM, DEVICE, AND METHOD FOR ACCESSING MEMORY BASED ON MULTI-PROTOCOL

CROSS-REFERENCE TO RELATED APPLICATION

This application is based on and claims priority under 35 U.S.C. § 119 to Korean Patent Application No. 10-2020-0150510, filed on Nov. 11, 2020, in the Korean Intellectual Property Office, the disclosure of which is incorporated by reference herein in its entirety.

BACKGROUND

Embodiments relate to memory access, and more particularly, to a system, a device, and a method for accessing a memory through a bus based on multi-protocol.

Apparatuses configured to process data may access a memory, and thus, may perform various operations. For example, apparatuses may process data read from a memory and write the processed data in the memory. Due to performance and functions required for a system, the system may include various apparatuses which communicate with one another through a link which provides a high bandwidth and low latency. A memory included in a system may be shared and accessed by two or more apparatuses. Therefore, the performance of a system may depend on communication efficiency between apparatuses and a time taken in accessing a memory, in addition to an operation speed of each apparatus.

SUMMARY

Embodiments provide a system, a device, and a method for low latency of memory access.

Provided herein is a device configured to communicate through a bus, the device including: a first interface circuit configured to, based on a first protocol, provide a first access to a first memory through the bus; and a second interface circuit configured to, based on a second protocol, provide a non-coherent input/output (I/O) interface through the bus, wherein the second interface circuit is further configured to provide a second access to the first memory through the bus by accessing the first memory in response to a first message received through the bus based on the second protocol.

Also provided herein is an operating method of a device connected to a bus, the operating method including: providing, based on a first protocol, a first access to a first memory through the bus; and providing, based on a second protocol, a non-coherent input/output interface through the bus, wherein the providing of the non-coherent input/output interface includes providing a second access to the first memory by accessing the first memory in response to a first message received through the bus based on the second protocol.

Also provided herein is a system including: a device connected to a bus and configured to communicate with a first memory; and a host processor, wherein the host processor is configured to: select a first protocol or a second protocol based on a size of first data, which is to be written in the first memory or to be read from the first memory, and perform a first access to the first memory through the bus based on the selected protocol, wherein the first protocol is a dedicated protocol for memory access, and the second protocol is a protocol for a non-coherent input/output.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
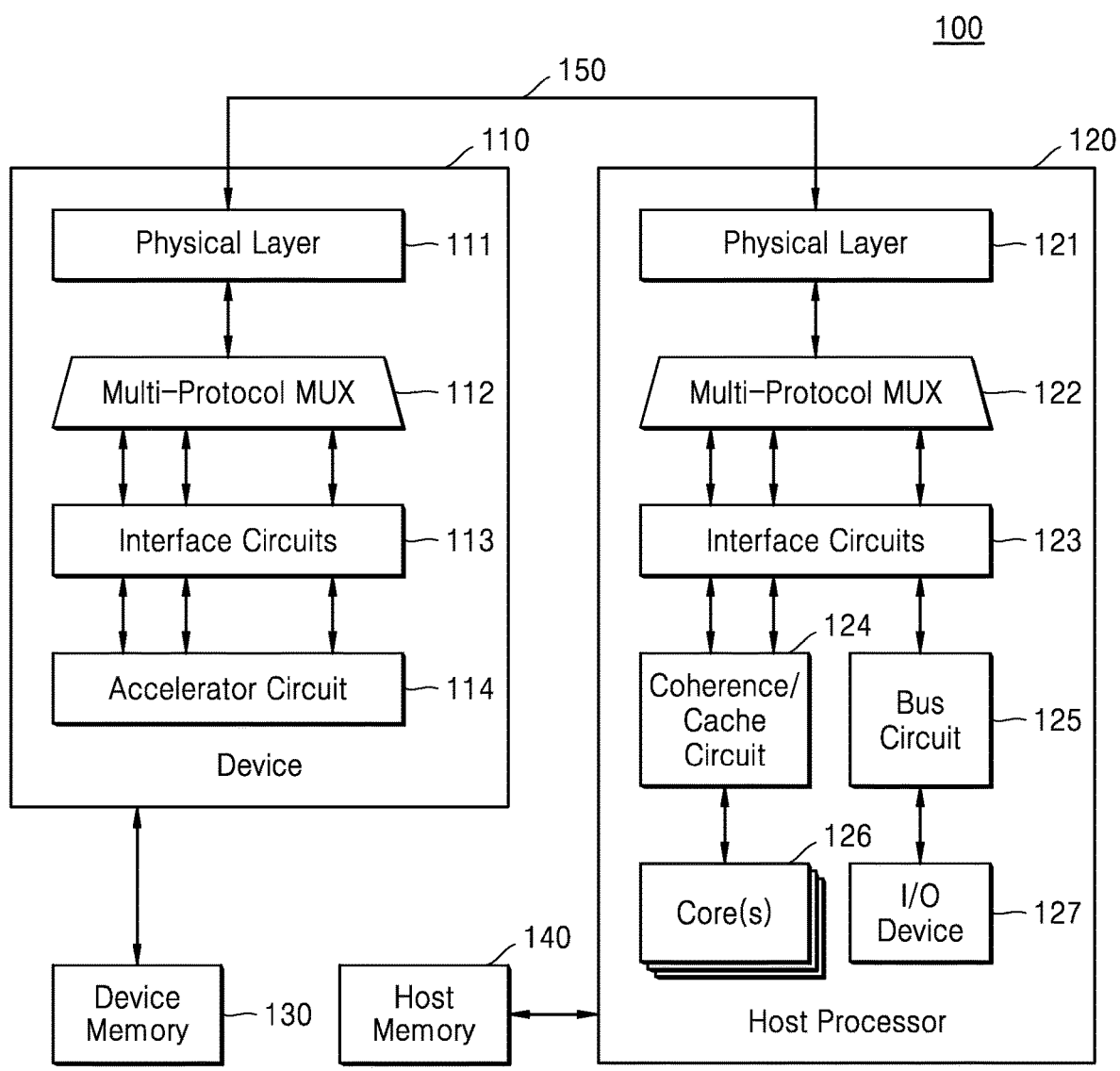
FIG. 1 is a block diagram illustrating a system according to an embodiment.

FIG. 1 is a block diagram illustrating a system 100 according to an embodiment. The system 100 may include an arbitrary computing system (or an element included in a computing system) including a device 110 and a host processor 120 which communicate with each other. For example, the system 100 may be included in a stationary computing system such as a desktop computer, a server, or kiosk, or may be included in a portable computing system such as a laptop computer, a mobile phone, or a wearable device. Also, in some embodiments, the system 100 may be included in a system-on-chip (SoC) or a system-in-package (SiP), where the device 110 and the host processor 120 are implemented in one chip or package. As illustrated in FIG. 1, the system 100 may include the device 110, the host processor 120, a device memory 130, and a host memory 140.

Referring to FIG. 1, the device 110 and the host processor 120 may communicate with each other through a link 150 and may transmit or receive a message and/or data therebetween through the link 150. Embodiments will be described with reference to the link 150 based on the compute express link (CXL) specification which supports CXL protocols, but are not limited thereto. In a non-limiting embodiment, the device 110 and the host processor 120 may communicate with each other based on coherent interconnect technologies such as XBus protocol, NVLink protocol, Infinity Fabric protocol, cache coherent interconnect for accelerators (CCIX) protocol, and coherent accelerator processor interface (CAPI) protocol.

In some embodiments, the link 150 may support multiple protocols and may transfer a message and/or data by using multiple protocols. For example, the link 150 may support CXL protocols including non-coherent protocol (e.g., CXL.io), coherent protocol (e.g., CXL.cache), and memory access protocol (or memory protocol) (e.g., CM.mem). In some embodiments, as a non-limiting example, the link 150 may support protocols such as peripheral component interconnect (PCI), PCI express (PCIe), universal serial bus (USB), and serial advanced technology attachment (SATA). Herein, protocol supported by the link 150 may be referred to as interconnect protocol.

The device 110 may denote an arbitrary device which provides a function useful for the host processor 120, and in some embodiments, may correspond to an accelerator based on the CXL specification. For example, software executed in the host processor 120 may offload at least a portion of a computing and/or input/output (I/O) operation to the device 110. In some embodiments, the device 110 may include at least one of a programmable component such as a graphic processing unit (GPU) or a neural processing unit (NPU), a component providing a fixed function like an intellectual property (IP) core, and a reconfigurable component such as field programmable gate array (FPGA). As illustrated in FIG. 1, the device 110 may include a physical layer 111, a multi-protocol multiplexer 112, a plurality of interface circuits 113, and an accelerator circuit 114 and may communicate with the device memory 130.

The accelerator circuit 114 may perform a useful function which is provided to the host processor 120 by the device 110 and may be referred to as an accelerator logic. As illustrated in FIG. 1, the accelerator circuit 114 may communicate with the host processor 120 through the interface circuits 113 by using multiple protocols. In some embodiments, the accelerator circuit 114 may include an element (e.g., 617 of FIG. 6) for solving the coherency of the device memory 130. Also, in some embodiments, as described below with reference to FIG. 2A, the accelerator circuit 114 may be omitted in the device 110.

The interface circuits 113 may support multiple protocols. For example, the interface circuits 113 may include two or more circuits for at least two of non-coherent protocol, coherent protocol, and memory access protocol. Based on corresponding protocol, each of the two or more circuits may provide the accelerator circuit 114 with a message received from the host processor 120, or may provide the host processor 120 with a message received from the accelerator circuit 114. As described below with reference to FIGS. 3A and 3B, the interface circuits 113 may provide the host processor 120 with access to the device memory 130 based on two or more protocols, and depending on the case, the host processor 120 may select optimal protocol for accessing the device memory 130. Therefore, the performance of the host processor 120 and the performance of the system 100 may be enhanced due to selecting an optimal protocol for providing the reduced latency of access to the device memory 130.

The multi-protocol multiplexer 112 may determine one of multiple protocols based on a message and/or data for communication between the accelerator circuit 114 and the host processor 120. The multi-protocol multiplexer 112 may include at least one protocol queue connected to the interface circuits 113, and the interface circuits 113 may transmit and receive a message and/or data to and from the host processor 120 through the at least one protocol queue. In some embodiments, the interface circuits 113 and the multi-protocol multiplexer 112 may be integrated into one element. In some embodiments, the multi-protocol multiplexer 112 may include a plurality of protocol queues respectively corresponding to multiple protocols supported by the link 150. Also, in some embodiments, the multi-protocol multiplexer 112 may arbitrate communications based on different protocols and may provide selected communications to the physical layer 111. In some embodiments, the physical layer 111 may be connected to a physical layer 121 of the host processor 120 through single interconnection, a bus, or trace.

The device memory 130, as illustrated in FIG. 1, may be connected to the device 110 and may be referred to as a device-attached memory. As illustrated in FIG. 1, when the device memory 130 is included in the system 100, the accelerator circuit 114 may communicate with the device memory 130 and may communicate with the device memory 130 based on a protocol (i.e., device-specific protocol) independent to the link 150. In some embodiments, as described below with reference to FIGS. 3A and 3B, the device 110 may include a memory interface (e.g., 315a of FIG. 3A) as an element for accessing the device memory 130, and the accelerator circuit 114 and/or the interface circuits 113 may access the device memory 130 through a memory interface. The memory interface may provide the device 110 (i.e., the accelerator circuit 114) with access to the device memory 130 and provide the host processor 120 with access to the device memory 130 through the link 150 and the interface circuits 113. In some embodiments, the device memory 130 may correspond to a device-attached memory based on the CXL specification. Herein, the device memory 130 may be referred to as being included in the device 110 and may be simply referred to as a memory.

The host processor 120 may include a main processor (e.g., a central processing unit (CPU)) of the system 100, and in some embodiments, may correspond to a host processor (or a host) based on the CXL specification. As illustrated in FIG. 1, the host processor 120 may be connected to the host memory 140 and may include the physical layer 121, a multi-protocol multiplexer 122, a plurality of interface circuits 123, a coherency/cache circuit 124, a bus circuit 125, at least one core 126, and an input/output (I/O) device 127.

The at least one core 126 may execute an instruction and may be connected to the coherency/cache circuit 124. The coherency/cache circuit 124 may include cache hierarchy and may be referred to as a coherency/cache logic. As illustrated in FIG. 1, the coherency/cache circuit 124 may communicate with the at least one core 126 and the interface circuits 123. For example, the coherency/cache circuit 124 may enable communication based on two or more protocols including coherent protocol and memory access protocol. In some embodiments, the coherency/cache circuit 124 may include a direct memory access (DMA) circuit. The I/O device 127 may be used for communicating with the bus circuit 125. For example, the bus circuit 125 may include a PCIe logic, and the I/O device 127 may include a PCIe I/O device.

The interface circuits 123 may enable communication between the elements (e.g., the coherency/cache circuit 124 and the bus circuit 125) of the host processor 120 and the device 110. In some embodiments, the interface circuits 123 may enable message and/or data communication between the elements of the host processor 120 and the device 110 based on multiple protocols (e.g., non-coherent protocol, coherent protocol, and memory protocol).

The multi-protocol multiplexer 122 may include at least one protocol queue. The interface circuits 123 may be connected to at least one protocol queue included in the multi-protocol multiplexer 122 and may transmit and receive a message and/or data to and from the at least one protocol queue. In some embodiments, the multi-protocol multiplexer 122 may determine one of multiple protocols based on a message and/or data for communication between the elements of the host processor 120 and the device 110. In some embodiments, the interface circuits 123 and the multi-protocol multiplexer 122 may be integrated into one element. In some embodiments, the multi-protocol multiplexer 122 may include a plurality of protocol queues respectively corresponding to multiple protocols supported by the link 150. Also, in some embodiments, the multi-protocol multiplexer 122 may arbitrate between communications based on different protocols and may provide selected communications to the physical layer 121.

Figure 2A:
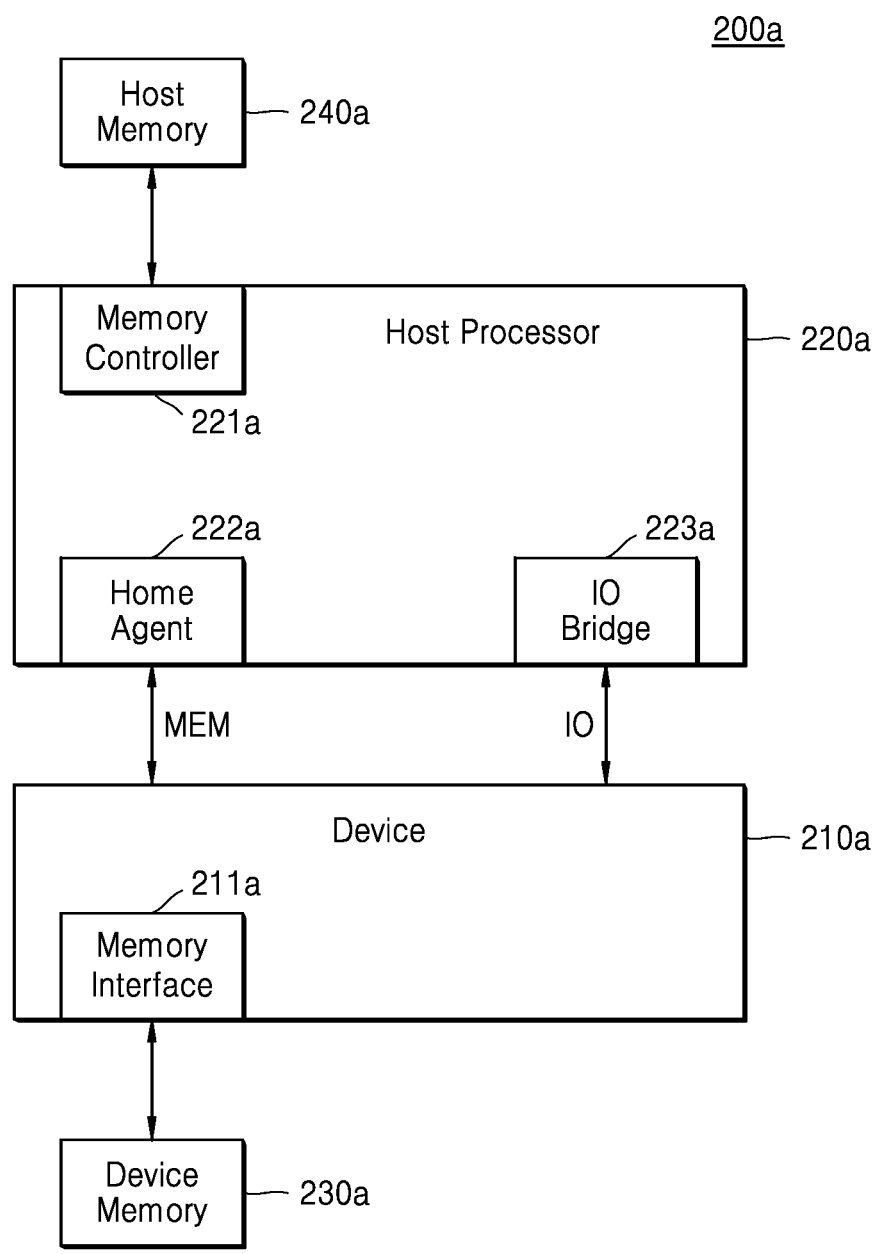
FIGS. 2A and 2B are block diagrams illustrating examples of a system according to embodiments.
Figure 2B:
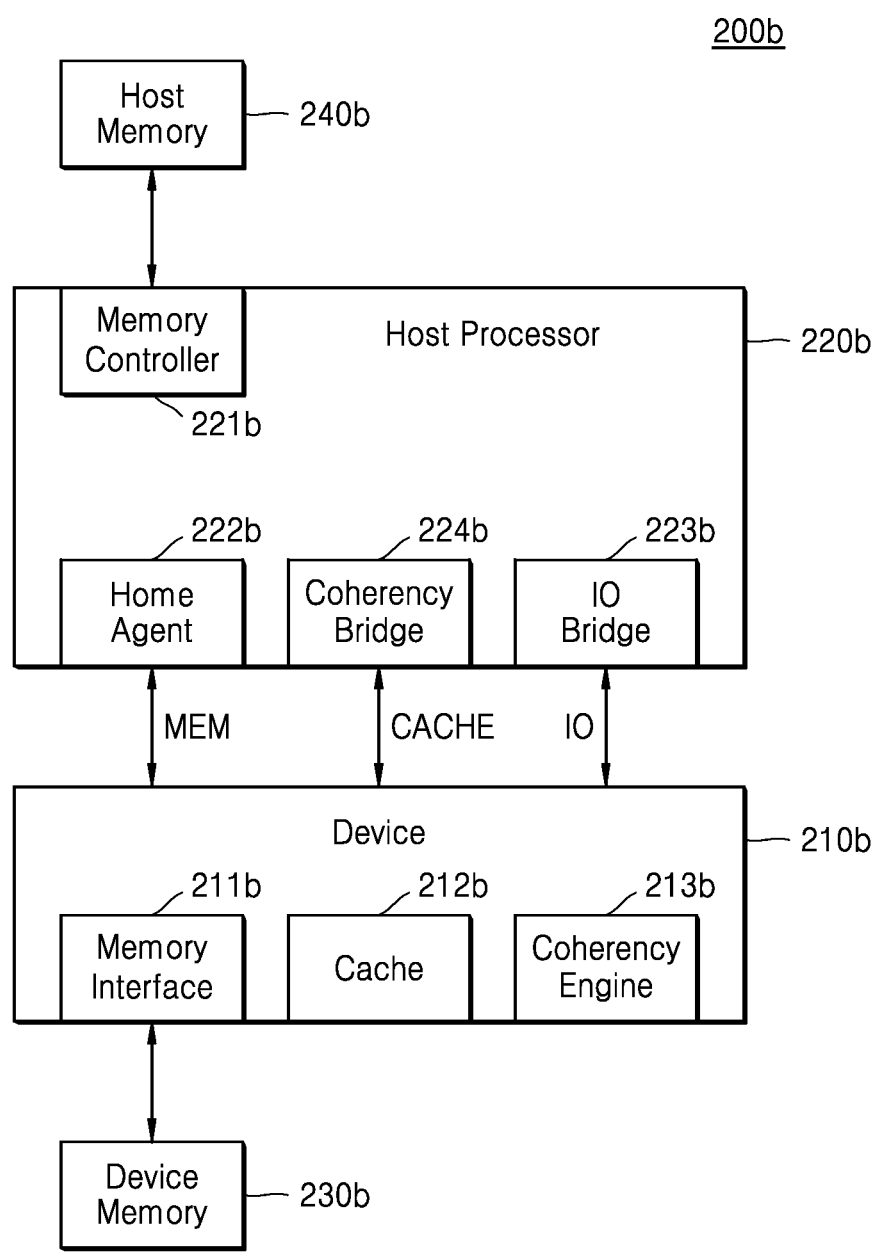

FIGS. 2A and 2B are block diagrams illustrating examples of a system according to embodiments. In detail, the block diagram of FIG. 2A illustrates a system 200a including a type 3 CXL device defined in the CXL specification, and the block diagram of FIG. 2B illustrates a system 200b including a type 2 CXL device defined in the CXL specification. Hereinafter, repetitive descriptions of FIGS. 2A and 2B may be omitted.

Referring to FIG. 2A, the system 200a may include a host processor 220a, a device 210a, a device memory 230a, and a host memory 240a. In some embodiments, the host processor 220a may be referred to as a root complex, the device 210a may be referred to as a memory expander, and the device 210a and the device memory 230a may be collectively referred to as a type 3 CXL device.

The host processor 220a may include a memory controller 221a, a home agent 222a, and an I/O bridge 223a. The memory controller 221a may provide access to the host memory 240a based on an interface of the host memory 240a. The home agent 222a may be referred to as a coherency engine. Also, the home agent 222a may communicate with the device 210a based on a memory protocol MEM and may resolve coherency for a given address. The memory protocol MEM may be dedicated protocol for access to the device memory 230a, and herein, may be referred to as first protocol. Also, the I/O bridge 223a may communicate with the device 210a based on non-coherent protocol IO, and in some embodiments, may include an input/output memory management unit (IOMMU). The host processor 220a may exchange a message for device discovery, enumeration, and error reporting and management with the device 210a. Herein, the non-coherent protocol IO may be referred to as second protocol.

In general, cache coherence may include verifying that caches of a memory resource have the same data, as a non-limiting example.

The device 210a may include a memory interface 211a. The memory interface 211a may be referred to as a memory interface circuit or a memory controller and may provide access to the device memory 230a based on an interface of the device memory 230a. In some embodiments, unlike the device 110 of FIG. 1, the device 210a may not include an active computing engine and may function as a memory expander. Therefore, the device 210a may not issue a request for the host processor 220a based on coherent protocol CACHE and may process a request of the host processor 220a based on the memory protocol MEM.

Referring to FIG. 2B, the system 200b may include a host processor 220b, a device 210b, a device memory 230b, and a host memory 240b. In some embodiments, the device 210b may be referred to as a device with memory, and the device 210b and the device memory 230b may be collectively referred to as a type 2 CXL device.

The host processor 220b may include a memory controller 221b, a home agent 222b, an I/O bridge 223b, and a coherency bridge 224b. The coherency bridge 224b may communicate with the device 210b based on the coherent protocol CACHE defining interactions between the device 210b and the host processor 220b. For example, the coherency bridge 224b may receive a request (e.g., D2H request), a response (e.g., D2H response), and data (e.g., D2H data) from the device 210b and may provide the device 210b with a request (e.g., H2D request), a response (e.g., H2D response), and data (e.g., H2D data).

The device 210b may include a memory interface 211b, a cache 212b, and a coherency engine 213b. In the device 210b, like the device 110 of FIG. 1, the cache 212b may be used by an accelerator circuit. The device 210b may use the coherent protocol CACHE for coherency transactions of the cache 212b. The coherency engine 213b may be referred to as a device coherency engine (DCOH). Also, the coherency engine 213b may resolve the coherency of the cache 212b and may manage bias states (e.g., a host bias mode and a device bias mode).

Figure 3A:
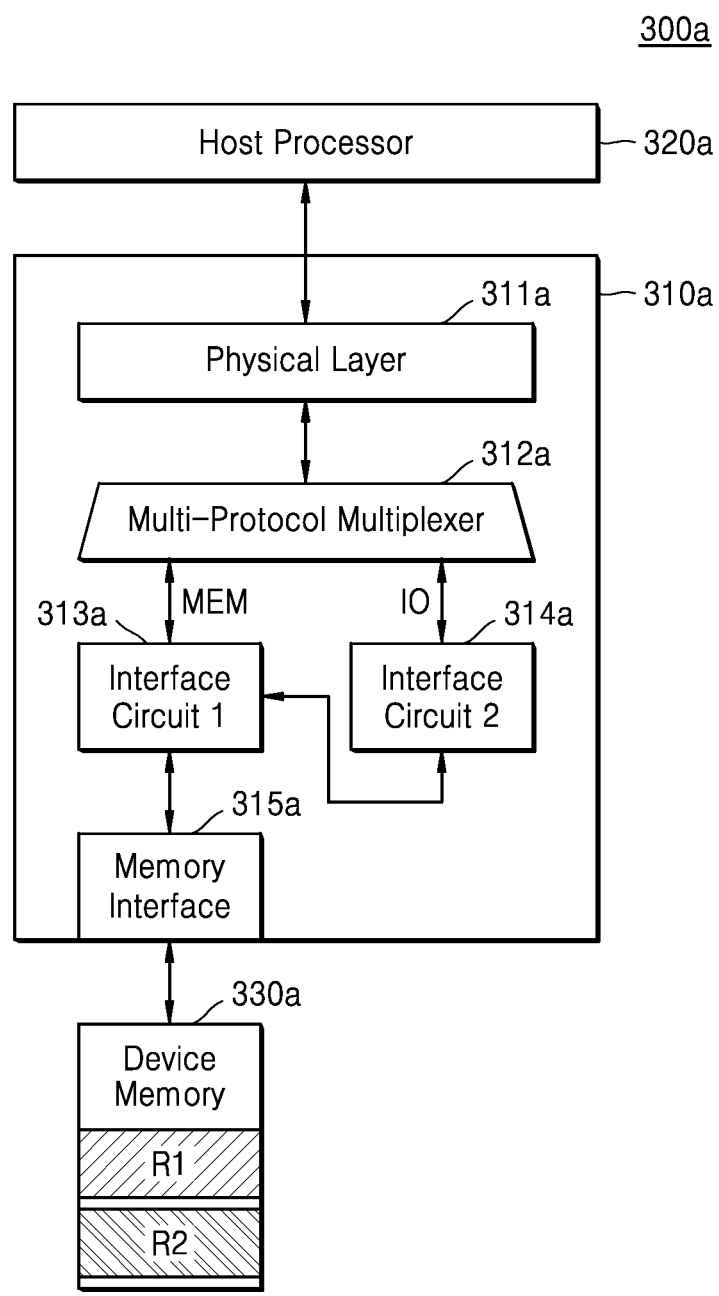
FIGS. 3A and 3B are block diagrams illustrating examples of a system according to embodiments.
Figure 3B:
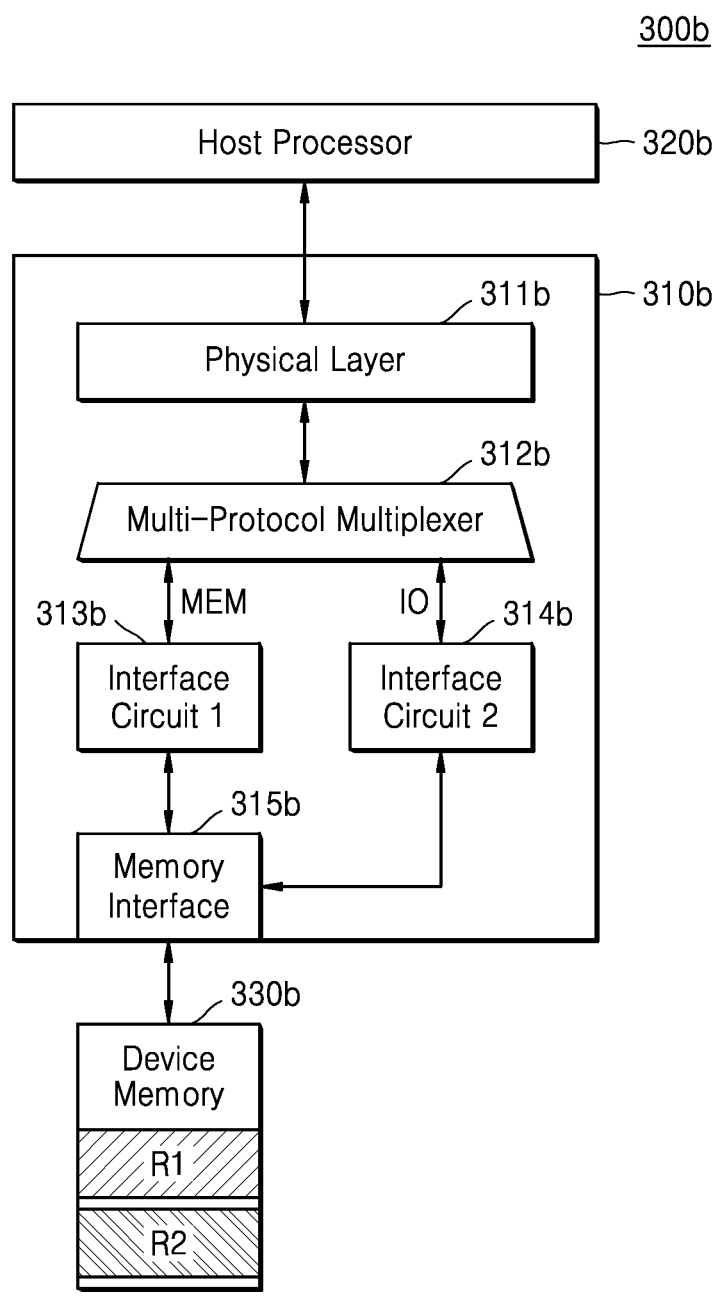

FIGS. 3A and 3B are block diagrams illustrating examples of a system according to embodiments. In detail, the block diagrams of FIGS. 3A and 3B illustrate systems 300a and 300b respectively including devices 310a and 310b providing access to device memories 330a and 330b based on memory protocol MEM and non-coherent protocol ID. In some embodiments, each of the systems 300a and 300b of FIGS. 3A and 3B may correspond to a system including a type 3 CXL device defined in the CXL specification. Hereinafter, repetitive descriptions of FIGS. 3A and 3B may be omitted.

Referring to FIG. 3A, the system 300a may include a host processor 320a, a device 310a, and a device memory 330a. In some embodiments, the system 300a may further include a host memory, and the host processor 320a may include a memory controller for accessing the host memory. The device 310a may include a physical layer 311a, a multi-protocol multiplexer 312a, a first interface circuit 313a, a second interface circuit 314a, and a memory interface 315a.

The first interface circuit 313a may communicate with the host processor 320a based on memory protocol MEM and may access the device memory 330a through the memory interface 315a based on a message which is received from the host processor 320a based on the memory protocol MEM. For example, the first interface circuit 313a may issue a request, to the memory interface 315a, to read and/or write data in response to a message received based on the memory protocol MEM. In response to a request of the first interface circuit 313a, the memory interface 315a may read data from the device memory 330a and may provide the read data to the first interface circuit 313a, or may write data, included in the request of the first interface circuit 313a, in the device memory 330a. Herein, access to the device memory 330a through the first interface circuit 313a based on the memory protocol MEM may be referred to as first access.

The second interface circuit 314a may provide a non-coherent input/output (I/O) interface based on the non-coherent protocol IO. The second interface circuit 314a may communicate with the host processor 320a based on the non-coherent protocol IO. Based on the non-coherent protocol IO, the second interface circuit 314a may receive a message for access to the device memory 330a, in addition to the message described above with reference to FIG. 2A, and may provide the host processor 320a with access to the device memory 330a. For example, as illustrated in FIG. 3A, the second interface circuit 314a may communicate with the first interface circuit 313a and may convert a message and/or data between the non-coherent protocol IO and the memory protocol MEM. Herein, access to the device memory 330a through the second interface circuit 314a based on the non-coherent protocol IO may be referred to as second access. Therefore, the device 310a may provide the host processor with first access based on the memory protocol MEM and second access based on the non-coherent protocol IO, in association with the device memory 330a.

The memory interface 315a may communicate with the first interface circuit 313a and the second interface circuit 314a and may communicate with the device memory 330a based on the interface of the device memory 330a. The device memory 330a may denote an arbitrary medium for storing data. In some embodiments, the device memory 330a may include a semiconductor memory device, and for example, may include a non-volatile memory device, such as resistive random access memory (RRAM), and/or a volatile memory device such as dynamic random access memory (DRAM) and static random access memory (SRAM).

The device memory 330a may be divided into a plurality of regions, and at least one of the divided regions may be for access (i.e., the first access) based on the memory protocol MEM and access (i.e., the second access) based on the non-coherent protocol IO, through the memory interface 315a. For example, as illustrated in FIG. 3A, the device memory 330a may include a first region R1 and a second region R2, the first region R1 may be for the first access, and the second region R2 may be for the first access and the second access. Therefore, the second region R2 may be used as a controller memory buffer (CMB), a persistent memory region (PMR), and a doorbell each supported by the non-coherent protocol IO, and as described below with reference to FIG. 5, the host processor may access the second region R2 through a base address register (BAR). Also, in some embodiments, the first region R1 and the second region R2 may be for the second access, and in this case, the first region R1 and the second region R2 may respectively correspond to different BARs. An operation of accessing, by the host processor 320a, the device memory 330a based on different protocols (i.e., the memory protocol MEM and the non-coherent protocol IO) will be described below with reference to FIG. 4.

Referring to FIG. 3B, the system 300b may include a host processor 320b, a device 310b, and a device memory 330b. The device 310b, like the device 310a of FIG. 3A, may include a physical layer 311b, a multi-protocol multiplexer 312b, a first interface circuit 313b, a second interface circuit 314b, and a memory interface 315b. Comparing with the embodiment of FIG. 3A, the second interface circuit 314b may communicate with the memory interface 315b. For example, based on the non-coherent protocol IO, the second interface circuit 314b may communicate with the host processor 320b and may access the device memory 330b through the memory interface 315b. Therefore, the second access may be performed through the second interface circuit 314b and the memory interface 315b.

Hereinafter, as described above with reference to FIG. 3A, examples where the second access is performed through the second interface circuit 314a, the first interface circuit 313a, and the memory interface 315a will be mainly described, but embodiments are not limited thereto.

Figure 4:
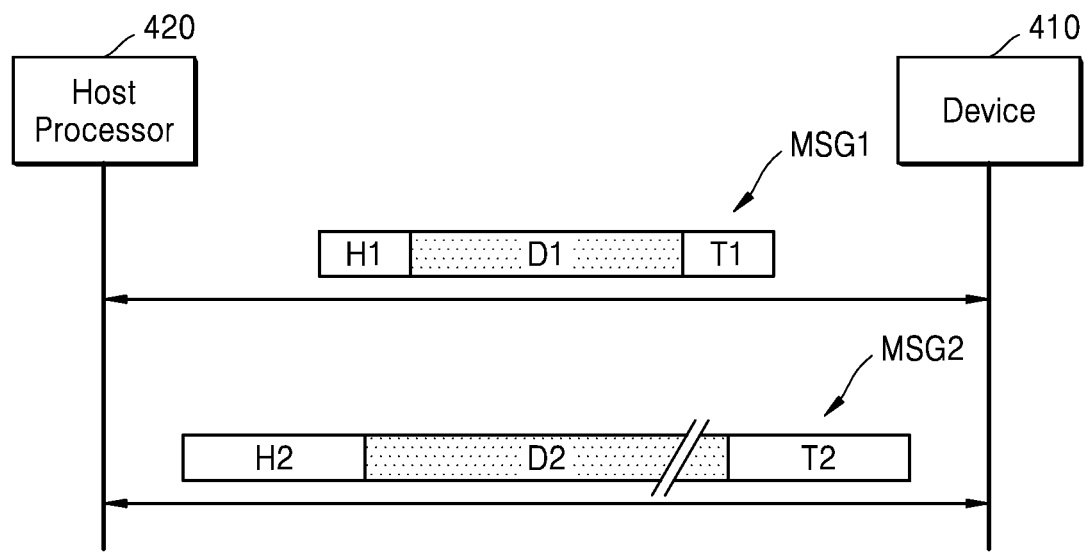
FIG. 4 is a message diagram illustrating an example of an operation of accessing a memory, according to an embodiment.

FIG. 4 is a message diagram illustrating an example of an operation of accessing a memory, according to an embodiment. As described above with reference to the drawings, a host processor 420 may access a memory included in a device 410 based on multiple protocols. In FIG. 4, a first message MSG1 may be based on first protocol (i.e., the memory protocol MEM of FIG. 3A), and a second message MSG2 may be based on second protocol (i.e., the non-coherent protocol IO of FIG. 3A).

Referring to FIG. 4, the first message MSG1 may include a first header H1, first data D1, and a first trailer T1. In some embodiments, the memory protocol MEM may support the first message MSG1 including the first data D1 having a fixed size. For example, CXL.mem may support a message including data of 64 byte (B). Therefore, the host processor 420 may provide the device 410 with the first message MSG1 including the first data D1 having a fixed size, in order to store data in a memory based on the memory protocol MEM. Also, the device 410 may provide the host processor 420 with the first message MSG1 including the first data D1 having a fixed size, in order to provide data stored in a memory based on the memory protocol MEM. Due to the first data D1 having a fixed size, the first header H1 and/or the first trailer T1 may be simpler than and smaller than a second header H2 and/or a second trailer T2 described below.

The second message MSG2 may include a second header H2, second data D2, and a second trailer T2. In some embodiments, the non-coherent protocol IO may support the second message MSG2 including the second data D2 having a variable size. For example, CXL.io may be based on PCIe.Non-volatile memory express (NVMe) corresponding to a memory access through a PCIe bus may support a message including data having a maximum of 4 kilobyte (KB). As described above with reference to FIGS. 3A and 3B, a memory included in the device 410 may be accessed based on the memory protocol MEM and may also be accessed based on the non-coherent protocol IO, and thus, the host processor 420 may transmit or receive, the second message MSG2 including the second data D2 having a variable size, to or from the device 410. For example, the host processor 420 may provide the device 410 with the second message MSG2 including the second data D2 having a variable size, in order to store data in a memory based on the non-coherent protocol IO. Also, the device 410 may provide the host processor 420 with the second message MSG2 including the second data D2 having a variable size, in order to provide data stored in the memory based on the non-coherent protocol IO. Due to the second data D2 having a variable size which is greater than a size (e.g., 64 B) supported by the memory protocol MEM, the second header H2 and/or the second trailer T2 may be greater than and more complicated than the first header H1 and/or the first trailer T1 described above.

Depending on the case, the host processor 420 may select one protocol from among the memory protocol MEM and the non-coherent protocol IO and may access the device 410 based on the selected protocol. In some embodiments, the host processor 420 may select the non-coherent protocol IO for data having a size which is greater than a threshold, and moreover, may select the memory protocol MEM for data having a size which is less than or equal to the threshold. For example, in order to write or read data having a small size (e.g., 64 B), the host processor 420 may transmit or receive the first message MSG1, including small overhead (i.e., the first header H1 and the first trailer T1), to or from the device 410. Also, in order to write or read data having a large size (e.g., 4 KB), the host processor 420 may transmit or receive the second message MSG2 to or from the device 410, instead of repeatedly transmitting or receiving the first message MSG1.

In a case where the memory included in the device 410 is used as a storage class memory (SCM) of the host processor 420, the swap-in and swap-out of data having a page size (i.e., 4 KB) may frequently occur. In a case where only access based on the memory protocol MEM is supported, the swap-in and swap-out of data of 4 KB may cause excessive first messages, and due to this, memory access (e.g., direct memory access (DMA)) may be very inefficient. However, as described above, in a case where memory access based on the non-coherent protocol IO is supported, the non-coherent protocol IO instead of the memory protocol MEM may be selected, and efficient DMA may be achieved due to the swap-in and swap-out of data based on the non-coherent protocol IO.

Figure 5:
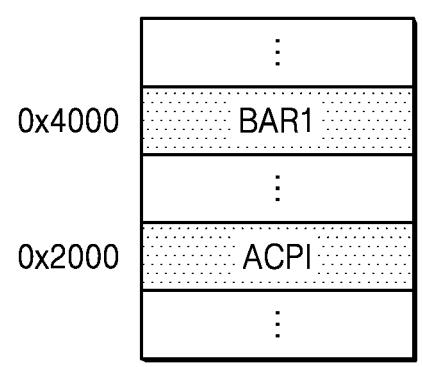
FIG. 5 is a diagram illustrating an address map according to an embodiment.

FIG. 5 is a diagram illustrating an address map 500 according to an embodiment. In some embodiments, the host processor 420 of FIG. 4 may access the memory included in the device 410 based on an address map 500, and FIG. 5 will be described below with reference to FIG. 4.

Referring to FIG. 5, the host processor 420 may access a region of a memory corresponding to an address 0x2000 based on an advanced configuration and power interface (ACPI) (i.e., the memory protocol MEM). For example, in order to read data stored in the region of the memory corresponding to the address 0x2000, the host processor 420 may provide the device 410 with a message MemRD including the address 0x2000 based on the memory protocol MEM.

The host processor 420 may access the region of the memory corresponding to the address 0x2000 based on a BAR (i.e., the non-coherent protocol IO). For example, the region of the memory corresponding to the address 0x2000 may correspond to a BAR1, and in order to read data stored in the region of the memory corresponding to the address 0x2000, the host processor 420 may provide the device 410 with a message MemRD including an address 0x4000 corresponding to the BAR1 based on the non-coherent protocol IO. As a result, the host processor 420 may access the same region of a memory through two addresses (e.g., an address corresponding to a BAR of the non-coherent protocol IO and an address of the memory protocol MEM).

Figure 6:
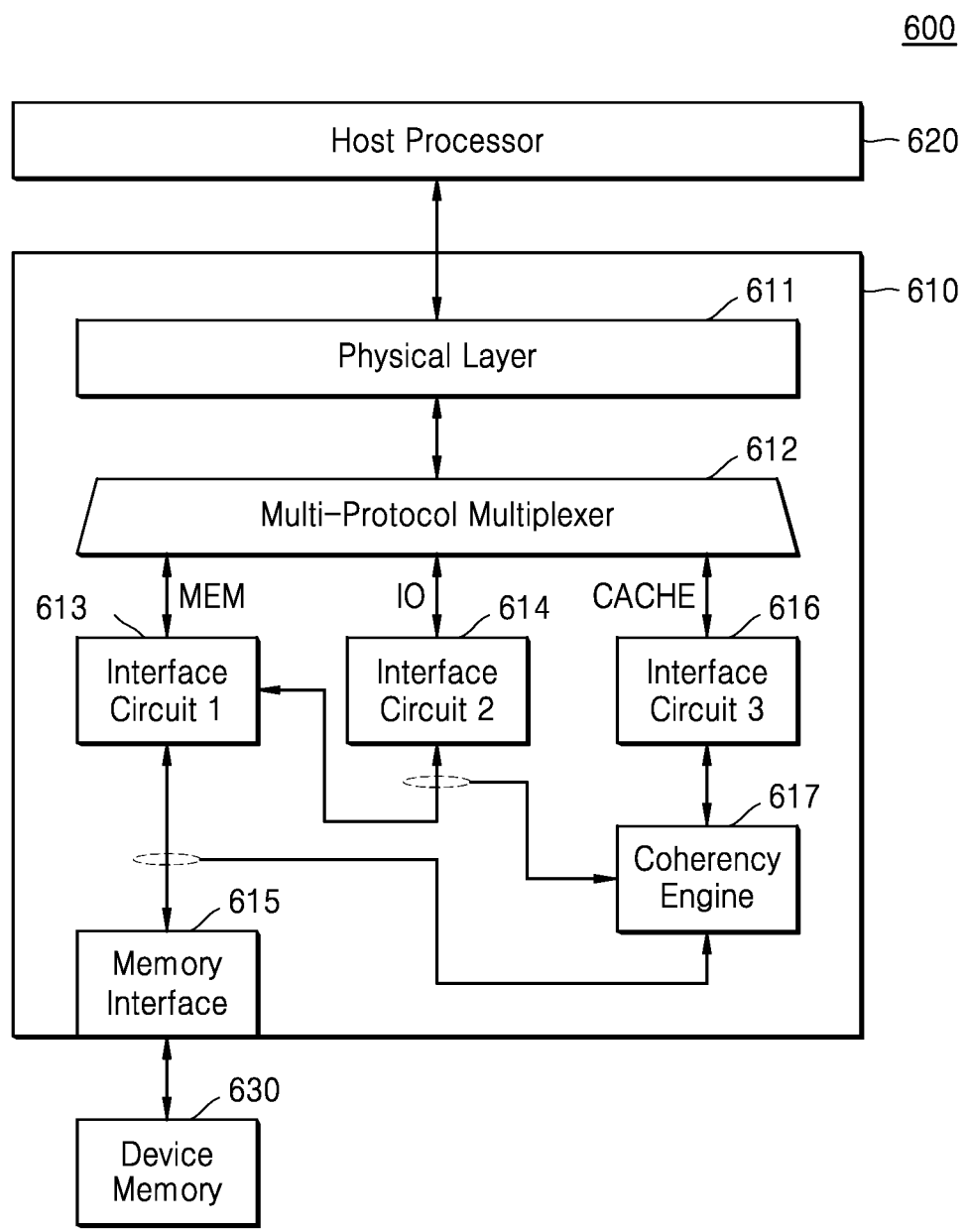
FIG. 6 is a block diagram illustrating a system according to an embodiment.

FIG. 6 is a block diagram illustrating a system 600 according to an embodiment. As illustrated in FIG. 6, the system 600 may include a host processor 620, a device 610, and a device memory 630. The device 610, like the device 310a of FIG. 3A, may include a physical layer 611, a multi-protocol multiplexer 612, a first interface circuit 613, a second interface circuit 614, and a memory interface 615, and moreover, may further include a third interface circuit 616 and a coherency engine 617. Hereinafter, in describing FIG. 6, repetitive descriptions of FIGS. 1, 3A, and 3B are omitted.

As described above with reference to FIG. 3A, the first interface circuit 613 may provide the host processor 620 with access (i.e., first access) to the device memory 630 based on the memory protocol MEM, and the second interface circuit 614 may provide the host processor 620 with access (i.e., second access) to the device memory 630 based on the non-coherent protocol IO Therefore, the device memory 630 may be accessed by the host processor 620 and/or other devices (e.g., an accelerator, a storage, etc.) connected to the bus based on different protocols, and the device 610 may further include a third interface circuit 616 for resolving the coherency of the device memory 630.

The coherency engine 617, as illustrated in FIG. 6, may monitor access (i.e., the first access) to the device memory 630 through the first interface circuit 613 and access (i.e., the second access) to the device memory 630 through the second interface circuit 614. The coherency engine 617 may verify the coherency of the device memory 630 based on a monitoring result of the first access and the second access and may resolve coherency based on a verification result. For example, the coherency engine 617 may adjust the order of the first access and the second access so as to resolve coherency and may issue a resolution to coherency from the host processor 620. The third interface circuit 616 may communicate with the host processor based on coherent protocol CACHE and may provide the host processor with a message (e.g., a request for a resolution to coherency) received from the coherent engine 617 based on the coherent protocol CACHE.

Figure 7A:
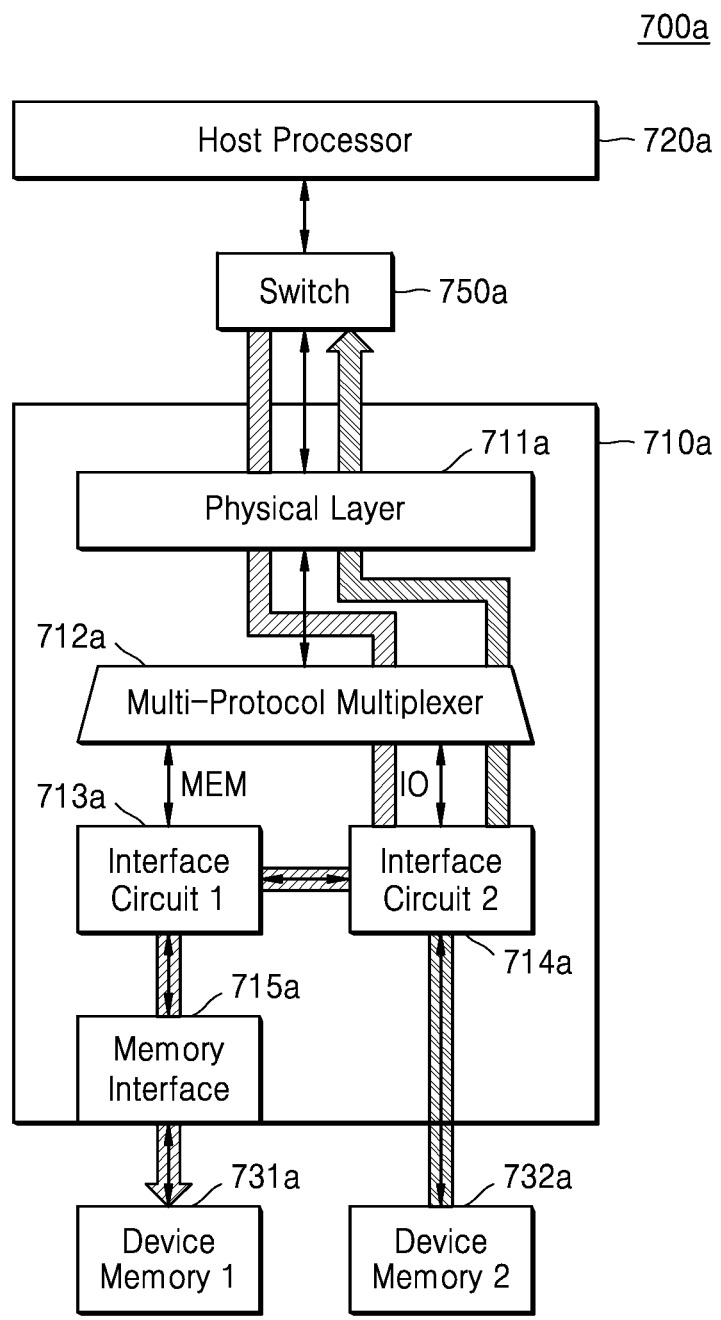
FIGS. 7A and 7B are block diagrams illustrating examples of a system according to embodiments.
Figure 7B:
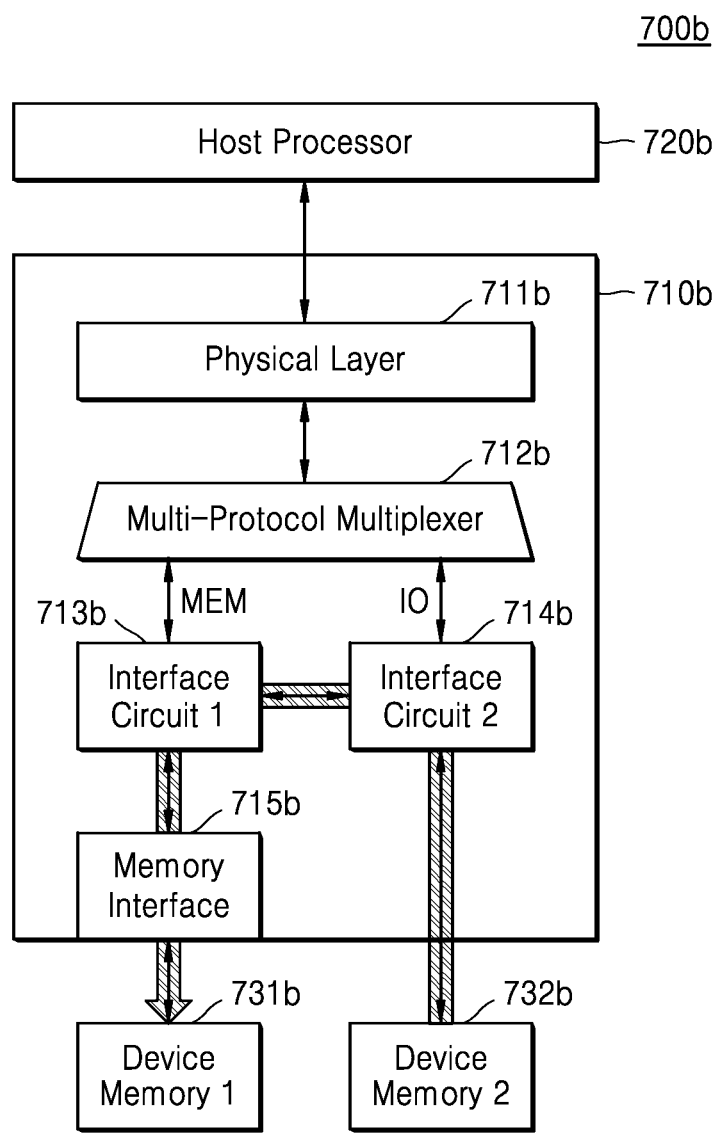

FIGS. 7A and 7B are block diagrams illustrating examples of a system according to embodiments. In detail, FIGS. 7A and 7B may respectively illustrate systems 700a and 700b for performing the swap-in and swap-out of data. In FIGS. 7A and 7B, a hatched wide arrow may represent the flow of data based on the swap-in and swap-out of data. As described above with reference to FIG. 4, a swap-in operation and a swap-out operation may be performed by page size. Hereinafter, repetitive descriptions of FIGS. 7A and 7B are omitted.

Referring to FIG. 7A, the system 700a may include a host processor 720a, a switch 750a, a device 710a, a first device memory 731a, and a second device memory 732a. In some embodiments, the system 700a may further include a host memory, and the host processor 720a may include a memory controller for accessing the host memory. In some embodiments, the device 710a, the first device memory 731a, and the second device memory 732a may be collectively referred to as a type 3 CXL device. The switch 750a may function as a message router and may be connected to additional devices as well as the host processor 720a and the device 710a. The device 710a, like the device 310a of FIG. 3A, may include a physical layer 711a, a multi-protocol multiplexer 712a, a first interface circuit 713a, a second interface circuit 714a, and a memory interface 715a, and the second interface circuit 714a may communicate with the second device memory 732a. The first device memory 731a may correspond to the device memory 330a of FIG. 3A, and as described above with reference to the drawings, the second interface circuit 714a may provide access (i.e., second access) to the first device memory 731a in response to a message received based on the non-coherent protocol IO.

The second device memory 732a may be accessed by the host processor 720a based on the non-coherent protocol IO. For example, the second device memory 732a may include an NVMe storage which may be accessed based on CXL.io. The host processor 720a may provide the device 710a with a message which instructs to copy data stored in the second device memory 732a to the first device memory 731a, based on the non-coherent protocol IO. The second interface circuit 714a may provide the switch 750a with data stored in the second device memory 732a based on the non-coherent protocol IO, in response to a message received based on the non-coherent protocol IO from the host processor 720a. The switch 750a may route data, received from the device 710a, to the device 710a again, and the second interface circuit 714a may write data, received from the switch 750a, in the first device memory 731a through the second interface circuit 714a, the first interface circuit 713a, and the memory interface 715a based on the non-coherent protocol IO.

Referring to FIG. 7B, the system 700b may include a host processor 720b and a device 710b. In some embodiments, like the system 700a of FIG. 7A, the system 700b may further include a switch between the host processor 720b and the device 710b. The device 710b, like the device 710a of FIG. 7A, may include a physical layer 711b, a multi-protocol multiplexer 712b, a first interface circuit 713b, a second interface circuit 714b, a memory interface 715b, a first device memory 731b, and a second device memory 732b.

The host processor 720b may provide the device 710b with a message which instructs to copy data stored in the second device memory 732b to the first device memory 731b, based on the non-coherent protocol IO. In response to a message received based on the non-coherent protocol IO from the host processor 720b, the second interface circuit 714b may provide the first interface circuit 713b with data received from the second device memory 732b, and the first interface circuit 713b may store data in the first device memory 731b through the memory interface 715b. Therefore, unlike the device 710a of FIG. 7A, the swap-in and swap-out of data may be performed in the device 710b of FIG. 7B.

Figure 8:
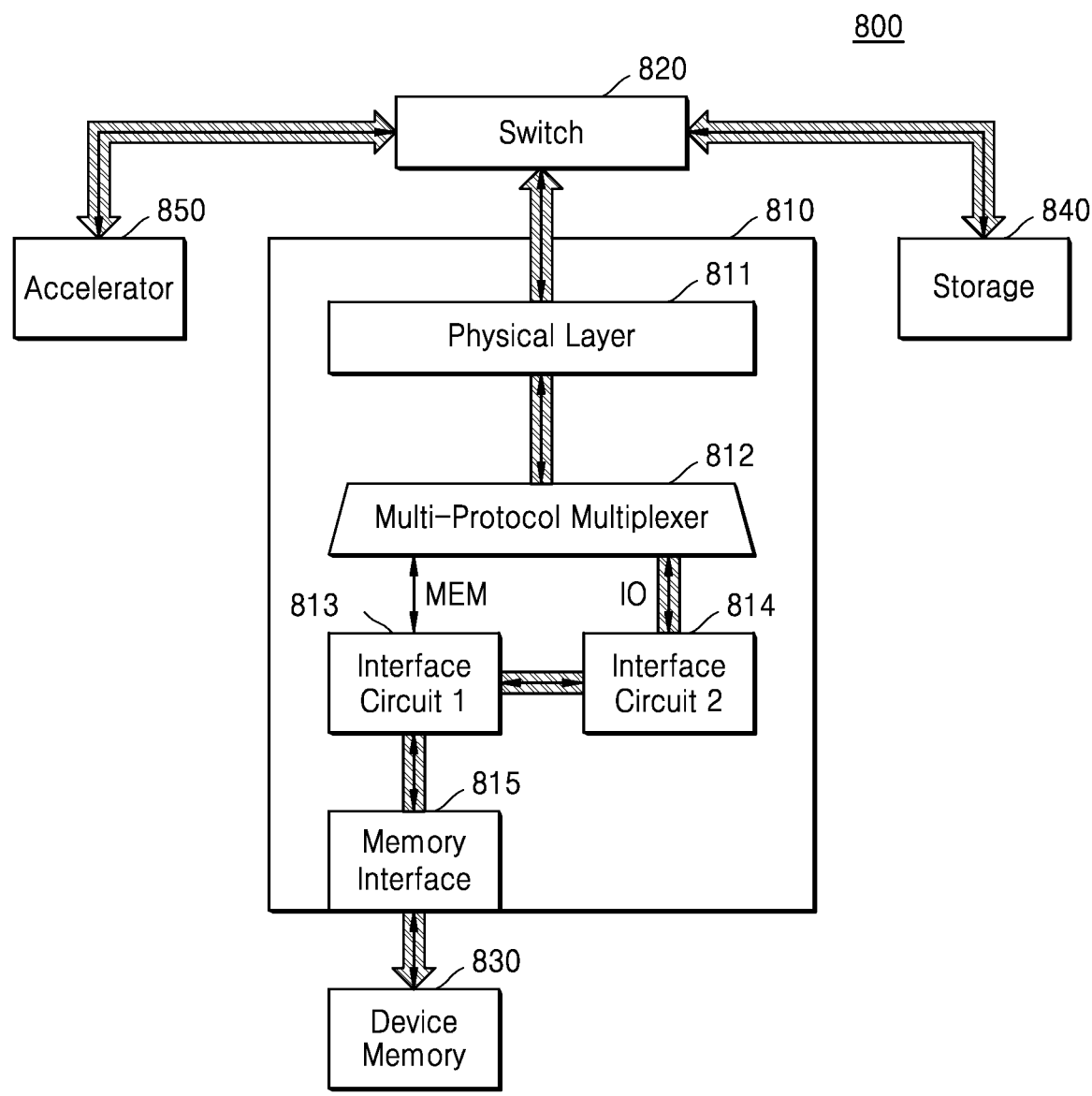
FIG. 8 is a block diagram illustrating a system according to an embodiment.

FIG. 8 is a block diagram illustrating a system 800 according to an embodiment. As illustrated in FIG. 8, the system 800 may include a device 810, a switch 820, a device memory 830, a storage 840 and an accelerator 850. The device 810, the storage 840 and the accelerator 850 may communicate with one another through the switch 820. The device 810, like the device 310a of FIG. 3A, may include a physical layer 811, a multi-protocol multiplexer 812, a first interface circuit 813, a second interface circuit 814, and a memory interface 815.

The device memory 830 may be accessed based on multi-protocol by other elements (e.g., the storage 840 and/or the accelerator 850) connected to a bus, in addition to a host processor. For example, as illustrated in FIG. 8, a message, which is for copying data stored in the first device memory 830 to the storage 840 or providing the date to the accelerator 850, may be transferred to the device 810 by the host processor or DMA based on the non-coherent protocol IO. In response to a message received based on the non-coherent protocol IO, the second interface circuit 814 may receive data from the device memory 830 through the first interface circuit 813 and the memory interface 815 and may provide the received data to the switch 820. The switch 820 may route data, received from the device 810, to the storage 840 or the accelerator 850, and the data provided from the switch 820 may be stored in the storage 840 or may be used (e.g., processed) by the accelerator 850.

Figure 9:
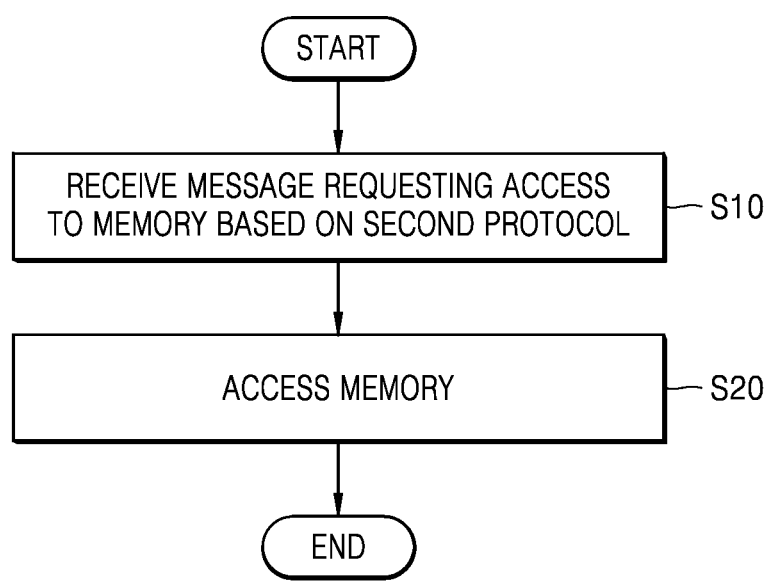
FIG. 9 is a flowchart illustrating a method of accessing a memory based on multi-protocol, according to an embodiment.

FIG. 9 is a flowchart illustrating a method of accessing a memory based on multi-protocol, according to an embodiment. As illustrated in FIG. 9, a method of accessing a memory based on multi-protocol may include operations S10 and S20. In some embodiments, the method of FIG. 9 may be performed by the device 310a of FIG. 3A. Hereinafter, FIG. 9 will be described with reference to FIG. 3A Referring to FIG. 9, in operation S10, a message for requesting access to a memory may be received based on second protocol. For example, the device 310a may include a device memory 330a accessed based on first protocol (e.g., the memory protocol MEM), and the second interface circuit 314a may receive a message, requesting access to the device memory 330a, from the bus based on second protocol (e.g., the non-coherent protocol IO). The second interface circuit 314a may identify that the message received based on the non-coherent protocol IO requests access to the device memory 330a.

In operation S20, the memory may be accessed. For example, the second interface circuit 314a may communicate with the first interface circuit 313a and may access the device memory 330a through the first interface circuit 313a and the memory interface 315a in response to the message received based on the non-coherent protocol IO. When a message received from the bus instructs to write data, the second interface circuit 314a may provide data, received based on the non-coherent protocol IO from the bus, to the memory interface 315a through the first interface circuit 313a, and the memory interface 315a may write the data in the device memory 330a. Also, when the message received from the bus instructs to read data, the second interface circuit 314a may receive data, read from the device memory 330a, through the first interface circuit 313a from the memory interface 315a and may transmit the data to the bus based on the non-coherent protocol IO.

Figure 10A:
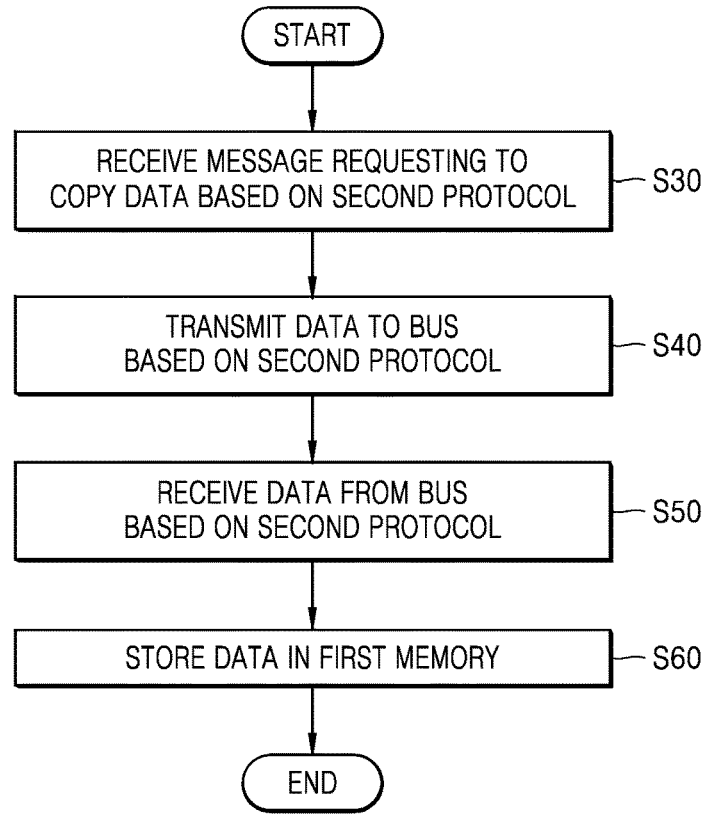
FIGS. 10A and 10B are flowcharts illustrating examples of a method of accessing a memory based on multi-protocol, according to embodiments.
Figure 10B:
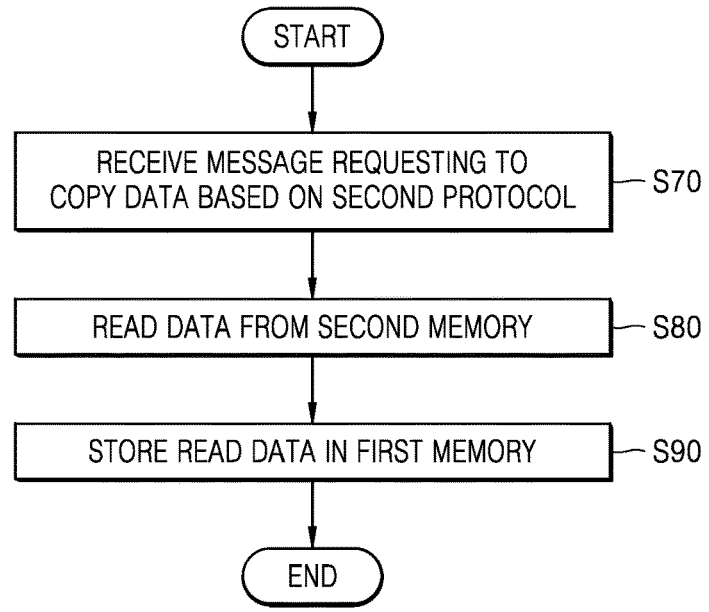

FIGS. 10A and 10B are flowcharts illustrating examples of a method of accessing a memory based on multi-protocol, according to embodiments. In detail, FIGS. 10A and 10B illustrate methods of accessing a memory in a device including a first device memory accessible by first protocol and second protocol and a second device memory accessible by the second protocol. In some embodiments, the method of FIG. 10A may be performed by the device 710a of FIG. 7A, and the method of FIG. 10B may be performed by the device 710b of FIG. 7B. Hereinafter, FIGS. 10A and 10B will be described with reference to FIGS. 7A and 7B.

Referring to FIG. 10A, a method of accessing a memory based on multi-protocol may include operations S30, S40, S50, and S60. In operation S30, a message requesting to copy data may be received based on the second protocol. For example, the second interface circuit 714a of FIG. 7A may receive a message, requesting to copy data stored in the second device memory 732a to the first device memory 731a, from the host processor 720a based on the second protocol (i.e., the non-coherent protocol IO).

In operation S40, data may be transmitted to the bus based on the second protocol. For example, in response to a message received based on the non-coherent protocol the second interface circuit 714a may transmit data, received from the second device memory 732a, to the bus based on the non-coherent protocol IO.

In operation S50, data may be received from the bus based on the second protocol. For example, the switch 750a may route the data, received from the device 710a in operation S40, to the device 710a again, and the second interface circuit 714a may receive data based on the non-coherent protocol IO.

In operation S60, the data may be stored in the first device memory 731a. As described above, the first device memory 731a may be accessed by the second interface circuit 714a supporting the second protocol (i.e., the non-coherent protocol IO), in addition to the first interface circuit 713a supporting the first protocol (i.e., the memory protocol MEM). The second interface circuit 714a may provide the data, received in operation S50, to the memory interface 715a through the first interface circuit 713a, and the memory interface 715a may store the data in the first device memory 731a.

Referring to FIG. 10B, the method of accessing a memory based on multi-protocol may include operations S70, S80, and S90. In operation S70, a message requesting to copy data may be received based on the second protocol. For example, the second interface circuit 714b of FIG. 7B may receive a message, requesting to copy data stored in the second device memory 732b to the first device memory 731a, from the host processor 720b based on the second protocol (i.e., the non-coherent protocol IO).

In operation S80, data may be read from the second device memory 732b, and the data, which is read in operation S90, may be stored in the first device memory 731b. For example, the second interface circuit 714b may receive data read from the second device memory 732b in response to the message which is received in operation S70. As described above, in order to provide access to the first device memory 731b based on the second protocol (i.e., the non-coherent protocol IO), the second interface circuit 714b may communicate with the memory interface 715b through the first interface circuit 713b, and thus, may provide the memory interface 715b with the data which is received from the second device memory 732b in operation S80. The memory interface 715b may store the data, received from the second interface circuit 714b through the first interface circuit 713b, in the first device memory 731b.

Figure 11A:
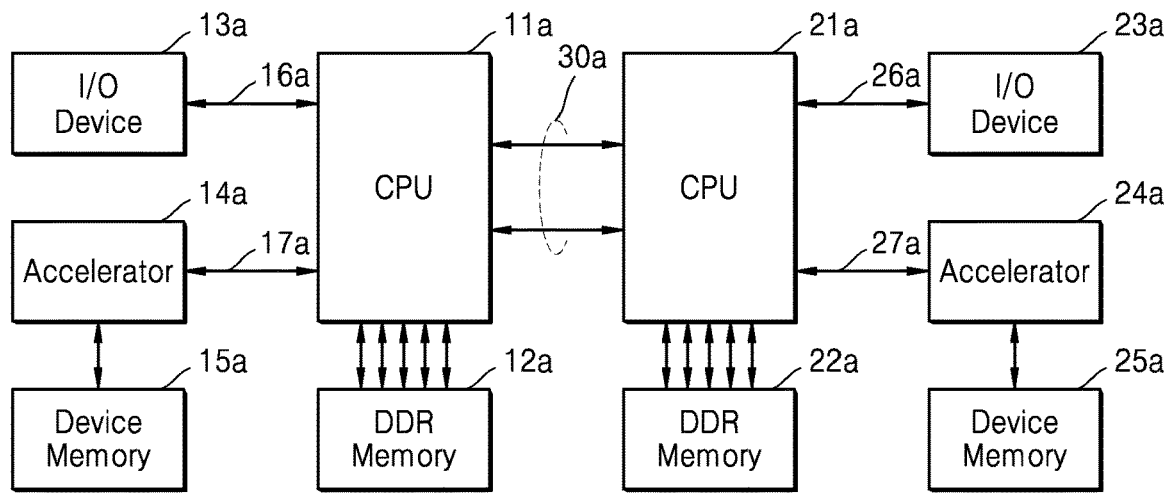
FIGS. 11A and 11B are block diagrams illustrating examples of a system according to embodiments.
Figure 11B:
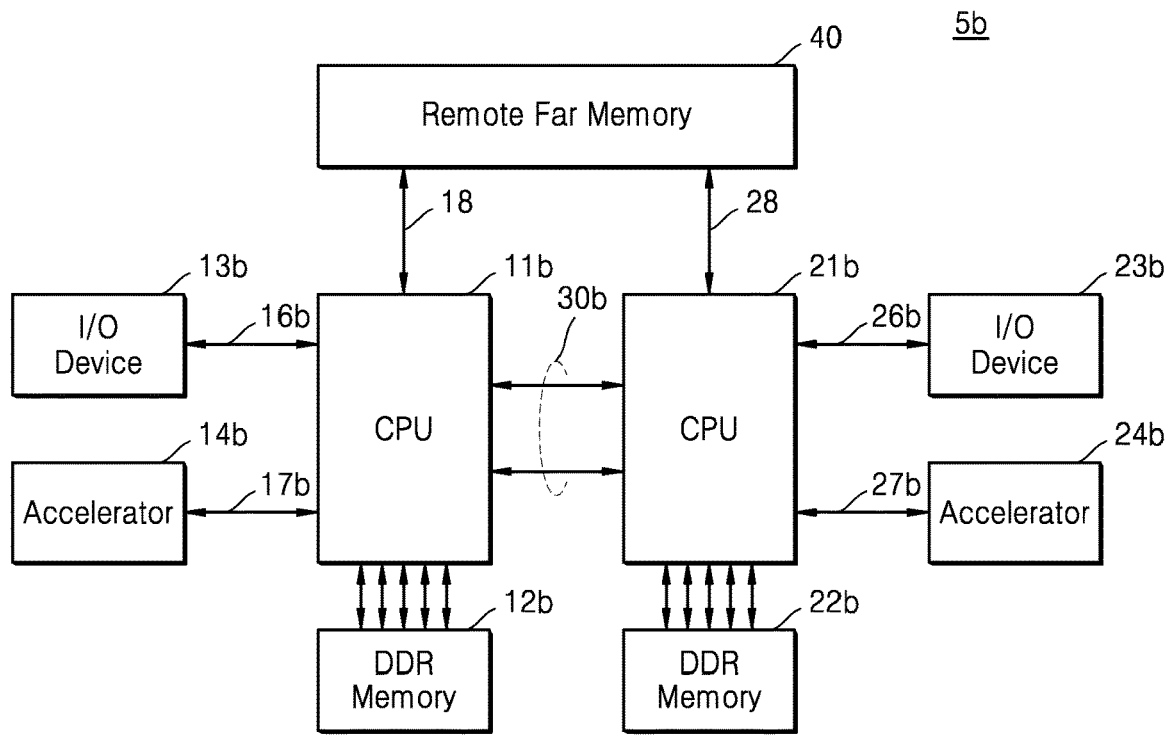

FIGS. 11A and 11B are block diagrams illustrating examples of a system according to embodiments. In detail, the block diagrams of FIGS. 11A and 11B illustrate systems 5a and 5b including a plurality of CPUs.

Referring to FIG. 11A, the system 5a may include a first CPU 11a and a second CPU 21a, and moreover, may include a first double data rate (DDR) memory 12a and a second DDR memory 22a respectively connected to the first CPU 11a and the second CPU 21a. The first CPU 11a may be connected to the second CPU 21a through the interconnect system 30a based on processor interconnect technology. As illustrated in FIG. 11A, the interconnect system 30a may provide at least one CPU-to-CPU coherent link.

The system 5a may include a first input/output (I/O) device 13a and a first accelerator 14a, which communicate with the first CPU 11a, and may include a first device memory 15a connected to the first accelerator 14a. The first CPU 11a may communicate with the first I/O device 13a through a bus 16a, and the first CPU 11a may communicate with the first accelerator 14a through the bus 17a. Also, the system 5a may include a second I/O device 23a and a second accelerator 24a, which communicate with the second CPU 21a, and may include a second device memory 25a connected to the second accelerator 24a. The second CPU 21a may communicate with the second I/O device 23a through a bus 26a, and the second CPU 21a may communicate with the second accelerator 24a through the bus 27a. In some embodiments, at least one of the first device memory 15a and the second device memory 25a may be omitted in the system 5a.

Communication based on at least some of multiple protocols may be performed through a plurality of buses 16a, 16b, 17a, 17b, 18, 26a, 26b, 27a, 27b, and 28. For example, information such as an initial setting may be transferred based on non-coherent protocol through each of the buses 16a, 16b, 17a, 17b, 18, 26a, 26b, 27a, 27b, and 28. Also, a message and/or data may be transferred based on coherent protocol and/or memory protocol through the buses 17a and 27a. Also, a message and/or data may be transferred based on memory protocol through the buses 18 and 28.

The first CPU 11a may select one protocol from among multiple protocols (e.g., memory protocol and non-coherent protocol) based on a size of data and may access the first device memory 15a based on the selected protocol. Therefore, optimal protocol may be selected, and latency associated with access to the device memory 15a may decrease. Also, the second CPU 21a may select one protocol from among multiple protocols (e.g., memory protocol and non-coherent protocol) based on a size of data and may access the first device memory 15a based on the selected protocol. Therefore, optimal protocol may be selected, and latency associated with access to the device memory 25a may decrease. The first CPU 11a may communicate with the second CPU 21a via the interconnect system 30a.

Referring to FIG. 11B, like the system 5a of FIG. 11A, the system 5b may include first and second CPUs 11b and 21b, first and second DDR memories 12b and 22b, first and second I/O devices 13b and 23b, and first and second accelerators 14b and 24b, and moreover, may further include a remote far memory 40. The first CPU 11b and the second CPU 21b may be connected to the remote far memory 40 through the buses 18 and 28, respectively. The remote far memory 40 may be used for expanding a memory in the system 5b, and the buses 18 and 28 may be used as a memory expansion port. In some embodiments, the remote far memory 40 may be omitted in the system 5b. The first CPU 11b may communicate with the second CPU 21b via the interconnect system 30b.

Figure 12:
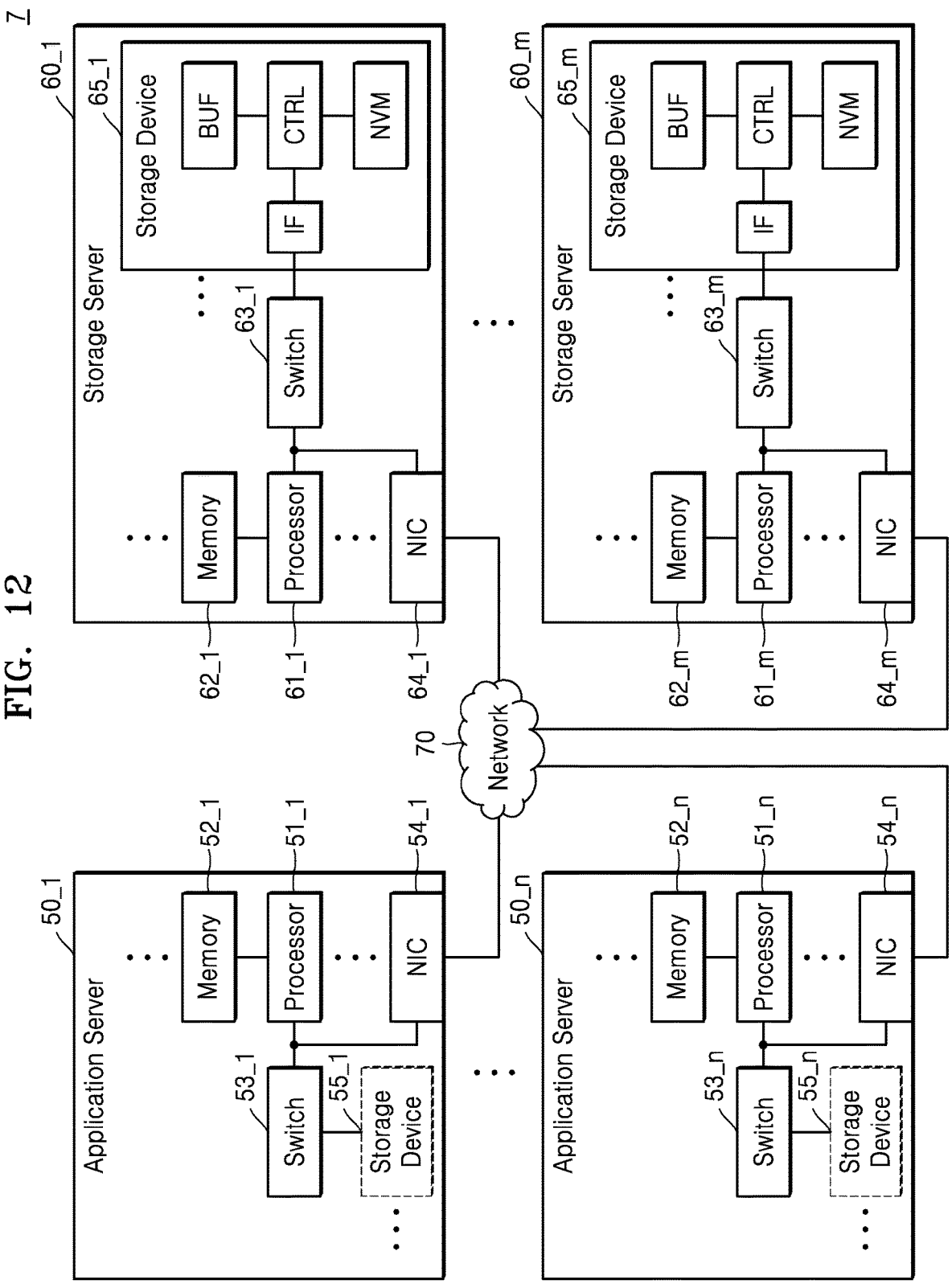
FIG. 12 is a block diagram illustrating a data center including a system according to an embodiment.

FIG. 12 is a block diagram illustrating a data center 7 including a system according to an embodiment. In some embodiments, the system described above with reference to the drawings may be included in the data center 7 as an application server and/or a storage server.

Referring to FIG. 12, the data center 7 may collect various pieces of data and may provide a service, and the data center 7 may be referred to as a data storage center. For example, the data center 7 may be a system for operating a search engine and a database, or may be a computing system used in enterprises such as banks or government organization. As illustrated in FIG. 12, the data center 7 may include a plurality of application servers 50_1 to 50_n (where n is an integer of more than 1) and a plurality of storage servers 60_1 to 60_m (where m is an integer of more than 1). The number "n" of application servers 50_1 to 50_n and the number "m" of storage servers 60_1 to 60_m may be variously set according to embodiments, and the number "n" of application servers 50_1 to 50_n may differ from the number "m" of storage servers 60_1 to 60_m (m≠n).

An application server 50_1 or 50_n may include at least one of a processor 51_1 or 51_n, a memory 52_1 or 52_n, a switch 53_1 or 53_n, a network interface controller (NIC) 54_1 or 54_n, and a storage device 55_1 or 55_n. The processor 51_1 or 51_n may control an overall operation of the application server 50_1 or 50_n and may access the memory 52_1 or 52_n to execute instructions and/or data loaded into the memory 52_1 or 52_n. In a non-limiting embodiment, the memory 52_1 or 52_n may include double data rate synchronous DRAM (DDR SDRAM), high bandwidth memory (HBM), hybrid memory cube (HMC), dual in-line memory module (DIMM), Optane DIMM, or non-volatile DIMM (NVMDIMM). According to embodiments, the number of processors and the number of memories included in the application server 50_1 or 50_n may be variously set. In some embodiments, the processor 51_1 to 51_n and the memory 52_1 to 52_n may provide a processor-memory pair. In some embodiments, the number of processors 51_1 or 51_n may differ from the number of memories 52_1 or 52_n. The processor 51_1 or 51_n may include a single-core processor or a multi-core processor. In some embodiments, as illustrated by a dotted line in FIG. 12, the storage device 55_1 or 55_n may be omitted in the application server 50_1 or 50_n. The number of storage devices 55_1 or 55_n included in the application server 50_1 or 50_n may be variously set according to embodiments. The processor 51_1 or 51_n, the memory 52_1 or 52_n, the switch 53_1 or 53_n, the network interface controller (NIC) 54_1 or 54_n, and/or the storage device 55_1 or 55_n may communicate with one another through a line described above with reference to the drawings.

A storage server 60_1 or 60_m may include at least one of a processor 61_1 or 61_m, a memory 62_1 or 62_m, a switch 63_1 or 63_m, an NIC 64_1 or 64_m, and a storage device 65_1 or 65_m. The processor 61_1 or 61_m and the memory 62_1 or 62_m may operate similar to the processor 51_1 or 51_n and the memory 52_1 or 52_n of the application server 50_1 or 50_n described above.

The application servers 50_1 to 50_n and the storage servers 60_1 to 60_m may communicate with one another through a network 70. In some embodiments, the network 70 may be implemented with fibre channel (FC) or Ethernet. The FC may be a medium used to transmit data at a relatively high speed, and an optical switch for providing high performance/high availability may be used. Based on an access scheme of the network 70, the storage servers 60_1 to 60_m may be provided as a file storage, a block storage, or an object storage.

In some embodiments, the network 70 may be a storage dedicated network such as a storage area network (SAN). For example, the SAN may be an FC-SAN which uses an FC network and is implemented based on FC protocol (FCP). On the other hand, the SAN may be an Internet protocol-SAN (IP-SAN) which uses a transmission control protocol/IP (TCP/IP) and is implemented based on iSCSI (SCSI over TCP/IP or Internet SCSI) protocol. In some embodiments, the network 70 may be a general network such as a TCP/IP network. For example, the network 70 may be implemented based on protocol such as FC over Ethernet (FCoE), network attached storage (NAS), or NVMe over Fabrics (NVMe-oF).

Hereinafter, the application server 50_1 and the storage server 60_1 will be mainly described, but a description of the application server 50_1 may be applied to another application server (e.g., 50_n) and a description of the storage server 60_1 may be applied to another storage server (e.g., 60_m).

The application server 50_1 may store data, requested to be stored by a user or a client, in one of the storage servers 60_1 to 60_m through the network 70. Also, the application server 50_1 may obtain data, requested to be read by the user or the client, from one of the storage servers 60_1 to 60_m through the network 70. For example, the application server 50_1 may be implemented with a web server or a database management system (DBMS).

The application server 50_1 may access the memory 52_n and/or the storage device 55_n, each included in the application server 50_n, through the network 70 and/or may access the memories 62_1 to 62_m and/or the storage devices 65_1 to 65_m, respectively included in the storage servers 60_1 to 60_m, through the network 70. Therefore, the application server 50_1 may perform various operations on data stored in the application servers 50_1 to 50_n and/or the storage servers 60_1 to 60_m. For example, the application server 50_1 may execute an instruction for moving or copying data between the application servers 50_1 to 50_n and/or the storage servers 60_1 to 60_m. In this case, the data may move from the storage devices 65_1 to 65_m of the storage servers 60_1 to 60_m to the memories 52_1 to 52_n of the application servers 50_1 to 50_n directly or through the memories 62_1 to 62_m of the storage servers 60_1 to 60_m. In some embodiments, data moving through the network 70 may be data which is encrypted for security or privacy.

In the storage server 60_1, an interface IF may provide a physical connection between the processor 61_1 and a controller CTRL and a physical connection between the NIC 64_1 and the controller CTRL. For example, the interface IF may be implemented based on a direct attached storage (DAS) scheme which directly accesses the storage device 65_1 by using a dedicated cable. Also, for example, the interface IF may be implemented based on various interface schemes such as advanced technology attachment (ATA), serial ATA (SATA), external SATA (e-SATA), small computer system interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and compact flash (CF) card interface.

In the storage server 60_1, based on control by the processor 61_1, the switch 63_1 may selectively connect the processor 61_1 to the storage device 65_1, or may selectively connect the NIC 64_1 to the storage device 65_1.

In some embodiments, the NIC 64_1 may include a network interface card, and a network adaptor. The NIC 64_1 may be connected to the network 70 by a wired interface, a wireless interface, a Bluetooth interface, and/or an optical interface. The NIC 64_1 may include an internal memory, a digital signal processor (DSP), and a host bus interface and may be connected to the processor 61_1 and/or the switch 63_1 through the host bus interface. In some embodiments, the NIC 64_1 may be integrated into at least one of the processor 61_1, the switch 63_1, and the storage device 65_1.

In the application servers 50_1 to 50_n or the storage servers 60_1 to 60_m, the processors 51_1 to 51_n and 61_1 to 61_m may transmit a command to the storage devices 55_1 to 55_n and 65_1 to 65_m or the memories 52_1 to 52_n and 62_1 to 62_m, thereby programming or reading data. In this case, the data may be data where an error has been corrected by an error correction code (ECC) engine. The data may be data on which data bus inversion (DBI) or data masking (DM) has been processed and may include cyclic redundancy code (CRC) information. The data may be data which is encrypted for security or privacy.

The storage devices 55_1 to 55_n and 65_1 to 65_m may transmit a control signal and a command/address signal to a non-volatile memory device (e.g., a NAND flash memory device) NVM in response to a read command received from the processors 51_1 to 51_n and 61_1 to 61_m. Therefore, in a case where data is read from the non-volatile memory device NVM, a read enable signal may be input as a data output control signal, and the data may be output to a DQ bus. A data strobe signal may be generated by using the read enable signal. A command and an address signal may be latched based on a rising edge or a falling edge of a write enable signal.

The controller CTRL may overall control an operation of the storage device 65_1. In an embodiment, the controller CTRL may include static random access memory (SRAM). The controller CTRL may write data in the non-volatile memory device NVM in response to a write command, or may read data from the non-volatile memory device NVM in response to a read command. For example, the write command and/or the read command may be generated based on a request provided from a host (e.g., the processor 61_1 of the storage server 60_1, the processor 61_m of the storage server 60_m, or the processor 51_1 or 51_n of the application server 50_1 or 50_n). A buffer BUF may temporarily store (buffer) data, which is to be written in the non-volatile memory device NVM, or data read from the non-volatile memory device NVM. In some embodiments, the buffer BUF may include DRAM. Also, the buffer BUF may store metadata, and the metadata may denote user data or data which is generated by the controller CTRL so as to manage the non-volatile memory device NVM. The storage device 65_1 may include a secure element (SE) for security or privacy.

While embodiments have been shown and described, it will be understood that various changes in form and details may be made therein without departing from the spirit and scope of the following claims.

What is claimed is:

1. A device configured to communicate through a bus, the device comprising:
   a first interface circuit configured to, based on a first protocol, provide a first access to a first memory through the bus, wherein the first access is to a first region of the first memory; and
   a second interface circuit configured to, based on a second protocol, provide a non-coherent input/output (I/O) interface through the bus as a second access, wherein the second access is to a second region of the first memory, and the second protocol is different than the first protocol, wherein
   the second interface circuit is further configured to receive a first message through the bus based on the second protocol and provide a second access to the first memory through the bus by accessing the first memory in response to the first message,
   wherein the second interface circuit is further configured to receive a second message from the bus based on the second protocol, and
   the second message is configured to cause the device to copy second data, stored in a second memory to the first memory, wherein the device is further configured to access the second memory through the second interface circuit,
   wherein the first protocol is CXL.mem of a compute express link (CXL), and
   the second protocol is CXL.io of CXL,
   wherein the second message is further configured to cause the device to perform at least part of a data swap by copying the second data, and
   wherein the second interface circuit is further configured to:
      transmit the second data to the bus based on CXL.io in response to the second message,
      receive the second data from the bus based on CXL.io, and
      provide the first memory with the second data received from the bus.

2. The device of claim 1, wherein the first access comprises first data having a first size which is fixed, and the second access comprises second data having a second size which is variable.

3. The device of claim 2, wherein the second size is greater than the first size.

4. The device of claim 1, further comprising a coherency engine configured to:
   monitor the first access and the second access, and
   resolve a coherency of the first memory.

5. The device of claim 4, further comprising a third interface circuit configured to provide a message of the coherency engine through the bus based on a third protocol.

6. The device of claim 1, wherein the second interface circuit is further configured to:
   transmit the second data to the bus based on the second protocol in response to the second message,
   receive the second data from the bus based on the second protocol, and
   provide the first memory with the second data received from the bus.

7. The device of claim 1, wherein the second interface circuit is further configured to:
   receive the second data from the second memory in response to the second message, and
   provide the second data to the first memory.

8. The device of claim 1, wherein the first interface is configured to support the first protocol and the first protocol is CXL.mem of a compute express link (CXL), and
   wherein the second interface is configured to support the second protocol and the second protocol is CXL.io of the CXL.

9. An operating method of a device connected to a bus, the operating method comprising:
   providing, based on a first protocol, a first access to a first memory through the bus, wherein the first access is to a first region of the first memory; and
   providing, based on a second protocol, a non-coherent input/output interface through the bus as a second access, wherein the second access is to a second region of the first memory, and the second protocol is different than the first protocol, wherein
   the providing of the non-coherent input/output interface comprises:
      receiving a first message through the bus based on the second protocol; and
      providing a second access to the first memory by accessing the first memory in response to the first message;
   wherein the providing, based on a second protocol, the non-coherent input/output interface comprises:
   receiving a second message from the bus based on the second protocol, wherein the second message is configured to cause the device to copy second data, stored in a second memory to the first memory, wherein the device is further configured to access the second memory through the second interface circuit,
   wherein the first protocol is CXL.mem of a compute express link (CXL), and
   the second protocol is CXL.io of CXL,
   wherein the second message is further configured to cause the device to perform at least part of a data swap by copying the second data, and
   wherein the providing, based on a second protocol, the non-coherent input/output interface further comprises:
      transmitting the second data to the bus based on CXL.io in response to the second message;
      receiving the second data from the bus based on CXL.io; and
      providing the first memory with the second data received from the bus.

10. The operating method of claim 9, wherein the providing of the first access comprises transmitting first data having a first size to the bus, or receiving the first data from the bus, the first size being fixed, and the providing of the second access comprises transmitting second data having a second size to the bus, or receiving the second data from the bus, the second size being variable.

11. The operating method of claim 9, further comprising resolving coherency of the first memory, wherein the resolving comprises monitoring the first access and the second access.

12. The operating method of claim 9, further comprising providing a third access to a second memory based on the second protocol, wherein
the providing of the second access comprises receiving a second message, wherein the second message is based on the second protocol, and
copying, in response to the second message, second data stored in the second memory to the first memory.

13. The operating method of claim 12, wherein the providing of the second access comprises:
transmitting the second data to the bus based on the second protocol in response to the second message;
receiving the second data from the bus based on the second protocol; and
storing the second data received from the bus in the first memory.

14. The operating method of claim 12, wherein the providing of the second access comprises:
reading, in response to the second message, the second data from the second memory; and
storing the second data in the first memory.

15. A system comprising:
a device connected to a bus and configured to communicate with a first memory; and
a host processor, wherein the host processor is configured to:
select a first protocol or a second protocol based on a size of first data, which is to be written in the first memory or to be read from the first memory, and
perform a first access to the first memory through the bus based on the selected protocol,
wherein
the first protocol is CXL.mem of a compute express link (CXL), and the second protocol is CXL.io of CXL,
wherein the device is further configured to:
receive a second message from the bus based on the second protocol, wherein the second message is configured to cause the device to copy second data, stored in a second memory to the first memory, wherein the device is further configured to access the second memory through a second interface circuit,
perform at least part of a data swap by copying the second data, wherein the copying comprises:
transmitting, by the device, the second data to the bus based on CXL.io in response to the second message,
receiving, by the device, the second data from the bus based on CXL.io, and
providing, by the device, the first memory with the second data received from the bus.

16. The system of claim 15, wherein the host processor is further configured to:
select the second protocol when the size of the first data is greater than a threshold value, and
select the first protocol when the size of the first data is less than or equal to the threshold value.

17. The system of claim 15, wherein the device is further configured to:
monitor the first access based on the first protocol;
monitor a second access based on the second protocol; and
provide, based on a third protocol, the host processor with a message for resolving coherency.

18. The system of claim 15, further comprising a switch connected to the bus, wherein
the device is further configured to:
read, based on the second protocol in response to the message, the second data from the second memory,
provide the switch with the second data, and
store the second data, received from the switch based on the second protocol, in the first memory.

* * * * *